(12) United States Patent
Shearer

(10) Patent No.: US 6,691,923 B2
(45) Date of Patent: Feb. 17, 2004

(54) LOW NOISE SOLID-STATE THERMOSTAT

(75) Inventor: Jon Douglas Shearer, Hartville, OH (US)

(73) Assignee: Goodrich Corporation, Charlotte, NC (US)

( * ) Notice: Subject to any disclaimer, the term of this patent is extended or adjusted under 35 U.S.C. 154(b) by 178 days.

(21) Appl. No.: 09/998,260

(22) Filed: Nov. 30, 2001

(65) Prior Publication Data

US 2002/0179725 A1 Dec. 5, 2002

Related U.S. Application Data

(60) Provisional application No. 60/294,840, filed on May 31, 2001.

(51) Int. Cl.[7] ............................................. G05D 15/00
(52) U.S. Cl. ..................................... 236/78 R; 219/501
(58) Field of Search ............................. 236/78 R, 78 B, 236/78 D; 62/229, 130; 219/501, 494, 510

(56) References Cited

U.S. PATENT DOCUMENTS

| | | | |
|---|---|---|---|
| 3,456,455 A | * 7/1969 | Sapir | 62/223 |
| 4,365,167 A | 12/1982 | Weimer et al. | 307/66 |
| 4,776,514 A | * 10/1988 | Johnstone et al. | 236/78 R |
| 5,351,162 A | 9/1994 | Koishikawa | 361/18 |
| 5,592,989 A | 1/1997 | Lynn et al. | 165/259 |
| 5,765,994 A | * 6/1998 | Barbier | 417/12 |
| 5,924,486 A | 7/1999 | Ethlers et al. | 165/238 |
| 6,006,996 A | 12/1999 | Bhatnagar | 236/78 R |
| 6,049,658 A | 4/2000 | Schave et al. | 392/472 |
| 6,134,134 A | 10/2000 | Dushane et al. | 363/143 |
| 6,396,032 B1 | * 5/2002 | Denny et al. | 219/501 |

* cited by examiner

*Primary Examiner*—Harry B. Tanner
(74) *Attorney, Agent, or Firm*—Renner, Otto, Boisselle & Sklar

(57) ABSTRACT

A low noise solid-state thermostat is provided designed to operate on AC power over a wide range of frequencies (e.g., from 0 Hertz (Hz) to 1000 Hz). The thermostat incorporates a soft start turn ON/OFF feature which reduces electromagnetic emissions (e.g., EMI). In addition, the thermostat is designed to provide common mode noise cancellation. Moreover, the thermostat uses state of the art complementary metal-oxide-semiconductor (CMOS) and metal-oxide-semiconductor field effect transistor (MOSFET) technology which improves reliability over conventional mechanical relays and thermostats. Custom temperature set points and custom temperature hysteresis can be selected at the time of production and/or subsequent to production.

14 Claims, 2 Drawing Sheets

LOW NOISE SOLID-STATE THERMOSTAT

CROSS REFERENCE TO RELATED APPLICATION

Priority is claimed to U.S. provisional application Ser. No. 60/294,840, filed on May 31, 2001, the entire disclosure of which is incorporated herein by reference.

TECHNICAL FIELD

The present invention deals with thermostats, and more particularly to solid state thermostats with low EMI/EMC noise operation.

BACKGROUND OF THE INVENTION

Mechanical thermostats are oftentimes used to control temperature in various different control environments. There are, however, various drawbacks associated with such conventional type thermostats. For example, mechanical thermostats tend to produce noise in the form of electromagnetic interference (EMI). This can be significant in environments in which noise level is critical. Furthermore, cycling on/off of such thermostats results in wear which can eventually lead to reliability problems.

Electronic thermostats have been developed which may alleviate some of the disadvantages associated with conventional mechanical thermostats. However, there remains a strong need in the art for a solid-state thermostat which provides low noise operation and high reliability.

SUMMARY OF THE INVENTION

According to one aspect of the invention, a low noise solid state thermostat is provided. The thermostat includes a thermostat input operatively configured to be coupled to a temperature sensor; a comparator for comparing an output of the temperature sensor to a predetermined set-point temperature; and solid-state switching circuitry operatively coupled to the comparator for selectively switching current to a thermostat output based on an output of the comparator.

The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
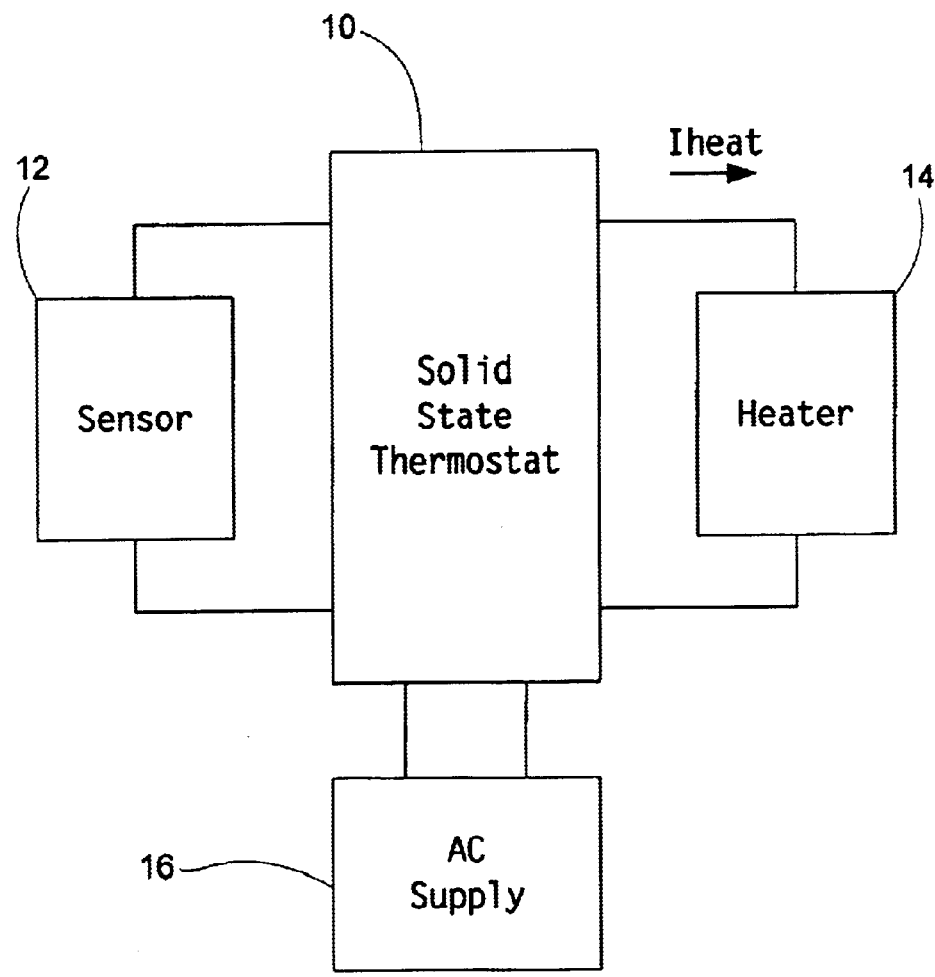
FIG. 1 is a block diagram of a system including a heater element, sensor and solid-state thermostat in accordance with the present invention.

Referring to FIG. 1, a low noise solid-state thermostat 10 is provided in accordance with the present invention. The thermostat 10 replaces conventional mechanical and electronic thermostats which are used to control temperatures and regulate power. For example, the thermostat 10 may be used to control temperature and regulate power in heated hoses, floor panels, drain masts and water heaters in an aircraft. It will be appreciated, however, that the thermostat 10 has utility with a variety of different control systems and is not necessarily limited to aircraft applications.

A temperature sensor 12 is coupled to an input of the thermostat 10. In the exemplary embodiment, the temperature sensor 12 is a resistive element (e.g., thermistor or the like) having an impedance which varies as a function of temperature. It will be appreciated, however, that a variety of other types of temperature sensors 12 may also be used without departing from the scope of the invention.

The output of the thermostat 10 is coupled to a heater element 14. In the exemplary embodiment, the heater element 14 is a resistive element thru which the thermostat 10 provides a controlled heater current $I_{heat}$. Again, however, it will be appreciated that a variety of other types of heater elements 14 may be used without departing from the scope of the invention. Moreover, the heater element 14 may instead be replaced by a cooling element, for example, in the case where controlled cooling is desired. An AC power supply 16 is included which supplies an AC operating voltage to the thermostat 10.

The thermostat 10 can be used in any of a variety of applications where temperature control via a heating (or cooling) element 14 is desired. As will be appreciated based on the following description, the thermostat 10 senses the actual temperature of a temperature regulated device or environment via the output of the sensor 12. Based on whether the actual temperature is above or below a predefined setpoint, for example, the thermostat 10 selectively provides current $I_{heat}$ to turn on/off the heater element 14. Additionally, it is possible to provide a predefined amount of hysteresis. In some cases, the sensor 12 may be located separate from the heater element 14. In other cases, the sensor 12 may be located proximate or even directly on the heater element 14 as will be appreciated.

The thermostat 10 is capable of operating using 115 volt AC single phase power from the power supply 16, and such AC power may be over a wide range of frequencies (e.g., from 0 Hertz (Hz) to 1000 Hz). As will be better appreciated based on the following description, the thermostat 10 incorporates a soft start turn ON/OFF feature which reduces electromagnetic emissions (e.g., EMI). In addition, the thermostat 10 is designed to provide common mode noise cancellation. Moreover, the thermostat 10 uses state of the art complementary metal-oxide-semiconductor (CMOS) and metal-oxide-semiconductor field effect transistor (MOSFET) technology which improves reliability over conventional mechanical relays and thermostats. The overall package may be on the order of 1.4 inch×0.8 inch×0.6 inch and can control 300 watts of power with 97% efficiency. Custom temperature set points and custom temperature hysteresis can be selected at the time of production and/or subsequent to production.

Figure 2:
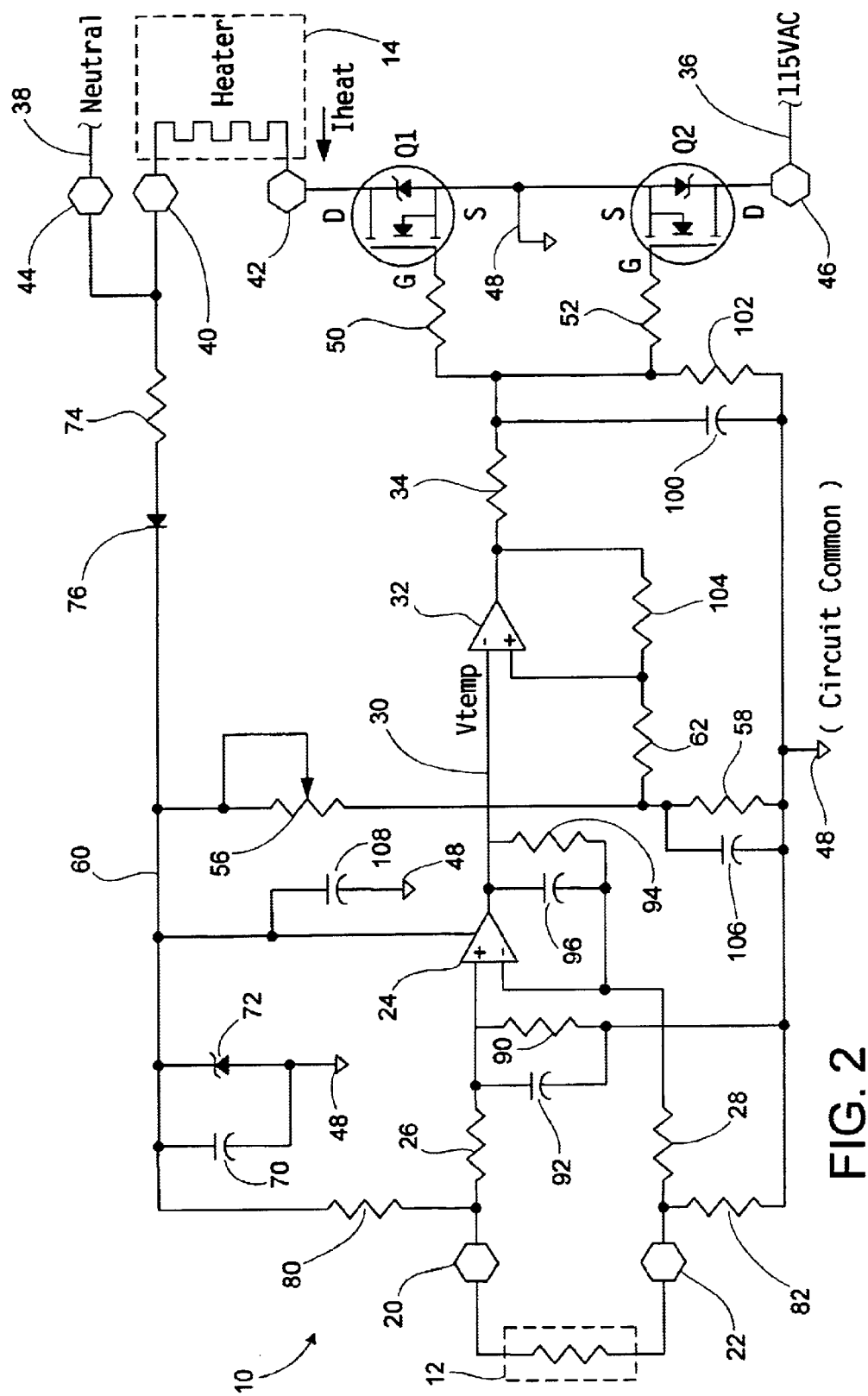
FIG. 2 is a schematic diagram of an exemplary embodiment of the solid-state thermostat in accordance with the present invention.

FIG. 2 illustrates an exemplary embodiment of the thermostat 10 in accordance with the present invention. The thermostat 10 includes a pair of input terminals 20 and 22. The resistive-type temperature sensor 12 is connected via a corresponding pair of leads to the input terminals 20 and 22 as shown in FIG. 2. The input terminals 20 and 22 are in turn coupled to the non-inverting and inverting inputs, respectively, of a differential amplifier 24 via resistors 26 and 28 included in the thermostat 10. As a result, the resistance of the temperature sensor 12 (as represented by the voltage thereacross) is presented as a voltage across the non-inverting and inverting inputs of the differential amplifier 24.

The differential amplifier 24 amplifies the voltage across the temperature sensor 12 by a predetermined gain to produce an amplified output voltage $V_{temp}$ on line 30. As will be appreciated, the voltage $V_{temp}$ is indicative of the temperature measured by the sensor 12. The voltage $V_{temp}$ is input to the inverting input of a comparator 32 which compares the voltage $V_{temp}$ to a predetermined setpoint temperature. Such setpoint temperature is represented, as will be described more fully below, by the voltage provided to the non-inverting input of the comparator 32. In the event the voltage $V_{temp}$ exceeds the setpoint temperature, the output of the comparator 32 goes low to the negative supply voltage. In the event the voltage $V_{temp}$ is less than the setpoint temperature, the output of the comparator 32 goes high to the positive supply voltage (e.g., 12 volts) as will be appreciated.

The output of the comparator 32 is connected via a resistor 34 to the respective gates of each of a pair of MOSFET switching transistors Q1 and Q2 included in the thermostat 10. As is shown in FIG. 2, the heater element 14 and transistors Q1 and Q2 are connected in series between a hot 115 volt AC line 36 and neutral line 38 to which power from the AC power supply 16 is provided. More specifically, the thermostat 10 includes output terminals 40 and 42 to which the respective leads of the resistive heater element 14 are connected. One lead of the heater element 14 is connected to output terminal 40, and the other lead is connected to the output terminal 42.

The neutral line 38 is coupled to the output terminal 40 via a neutral line terminal 44. The hot AC line 36 is coupled to the drain D of switching transistor Q2 via an AC hot terminal 46. The source S of the switching transistor Q2 is coupled to the source S of the switching transistor Q1, and both are tied to a circuit common 48. The circuit common 48 floats in the sense that its potential is not fixed relative to the operating voltage provided by the AC power supply 16. The drain D of the switching transistor Q1 is coupled to one end of the heater element 14 via terminal 42. When the switching transistors Q1 and Q2 are on, the heater current $I_{heat}$ flows primarily from the neutral line 38 thru the heater 14, the switching transistors Q1 and Q2, and the hot AC line 36. When the switching transistors Q1 and Q2 are off, no current flows thru the heater element 14.

Resistors 50 and 52 are respectively coupled to the gates of the switching transistors Q1 and Q2, and are connected to the output of the comparator 32 via the resistor 34. As previously mentioned, in the event the voltage $V_{temp}$ is less than the setpoint temperature the output of the comparator 32 goes high to the positive supply voltage. This results in the gate voltage to the transistors Q1 and Q2 going high and turning the transistors on, thus causing the heater current $I_{heat}$ to flow thru the heater element 14 to produce heating. Conversely, when the output of the comparator 32 goes low the gate voltage to the transistors Q1 and Q2 is low thus turning the transistors off. As a result, the heater current $I_{heat}$ does not flow thru the heater element 14 and the heater element 14 is inactive.

Thus, it will be appreciated that the thermostat 10 controls whether the heater element 14 is on or off based on whether the temperature as measured by the sensor 12 is above or below the predetermined setpoint temperature. Resistors 56 and 58 are provided for establishing the setpoint temperature. The resistors 56 and 58 are connected in series between a floating supply voltage provided on line 60 and the circuit common 48. The resistors 56 and 58 form a voltage divider, and the node between the resistors 56 and 58 is coupled to the non-inverting input of the comparator 32 via a resistor 62. The values of the resistors 56 and 58 are selected to provide a desired voltage representing the predetermined setpoint temperature to the comparator 32. In the exemplary embodiment, the resistor 56 is a potentiometer which facilitates setting and/or changing the setpoint temperature as will be appreciated.

The floating supply voltage on line 60 is provided via a parallel combination of a capacitor 70 and zener diode 72 connected between line 60 and the circuit common 48. Specifically, current from the neutral line 38 passes thru a current limiting resistor 74 and blocking diode 76 onto line 60. This charges up the capacitor 70 to a reference level defined by the breakdown voltage of the zener diode 72 (e.g., 12 volts).

The input terminal 20 is tied to the floating supply voltage via a resistor 80. Similarly, the input terminal 22 is tied to the circuit common 48 via a resistor 82. The voltage across the sensor 12 thus becomes the voltage difference between the floating supply voltage and the circuit common less the voltage across the resistors 80 and 82.

A resistor 90 and capacitor 92 are connected in parallel between the non-inverting input of the differential amplifier 24 and the circuit common 48. A resistor 94 and capacitor 96 are coupled in parallel between the output of the differential amplifier 24 and its inverting input. A capacitor 100 and resistor 102 are provided in parallel between the circuit common 48 and the node coupling the resistor 34 and the resistors 50 and 52. Additionally, a feedback resistor 104 is provided between the output of the comparator 32 and its non-inverting input. A filter capacitor 106 is connected in parallel across the resistor 58. Finally, a filter capacitor 108 is connected between the floating supply line 60 and the circuit common 48 to filter noise from the supply voltage to the amplifier 24.

The resistors 80 and 82 preferably are selected so as to have the same value. Thus, the input terminals 20 and 22 tend to float at the same voltage as will be appreciated. The resistors 26 and 28 are also selected so as to have the same value, as are the resistors 90 and 94, thus resulting in a balanced amplifier 24.

The capacitors 92 and 96 combine with the resistors 90 and 94, respectively, to provide desired filtering to the respective inputs of the differential amplifier 24. By also making the values of the capacitors 92 and 96 the same, true common mode filtering is obtained with respect to the voltage across the sensor 12. The particular values of the resistors 26, 28, 90, 94 and capacitors 92 and 96 may be selected in order to provide a desired amount of gain to the differential amplifier 24 with common mode filtering, as will be appreciated. Such common mode filtering is desirable especially in noisy environments in which noise could otherwise trip the thermostat and/or cause erratic temperature control.

For AC operation, during every negative half-cycle the capacitor 70 will charge up through the zener diode 72, and during every positive half-cycle, the capacitor 70 will hold the charge. More specifically, during a negative half-cycle current is provided from the neutral line 38 to the resistor 74, thru the blocking diode 76, thru the zener diode 72 to the circuit common 48, and thru the body diode of the switching transistor Q2 to complete the path to the hot AC line 36. Such current charges up the capacitor 70 during the negative half-cycles of AC operation, and during the positive half-cycles the capacitor 70 holds the charge.

Moreover, the thermostat 10 is capable of operating in a DC mode (i.e., 0 Hz) whereby a DC voltage is provided across the terminals 44 and 46. As long as the voltage at terminal 44 is more positive than the voltage at terminal 46 and at a voltage above which the zener diode 72 regulates, the capacitor 70 will charge up to the desired floating supply voltage on line 60. Regardless of whether the thermostat 10 is operating in an AC mode or DC mode, when the switching transistors Q1 and Q2 are turned on the supply voltage provided across the terminals 44 and 46 is placed substantially across the heater element 14.

The switching transistors Q1 and Q2 may comprise, for example, transistors capable of withstanding large transient voltage spikes. Such transistors are particularly useful in aircraft applications of the thermostat where large voltage spikes across the supply lines can occur as a result of lightning strikes, etc. Exemplary transistors include commercially available Infineon CoolMOS transistors, Model No. SPB20N6055-E3045A.

The capacitor 106 serves as a filter across the resistor 58, and specifically the reference voltage thereacross which represents the predetermined setpoint temperature. The particular value of the capacitor 106 may be optimized based on the frequency range at which the thermostat 10 is designed to operate. The resistor 102 ties the output of the comparator 32 to the circuit common 48 thru the resistor 34.

The resistors 62 and 104 provide hysteresis with respect to switching on/off of the transistors Q1 and Q2. More particularly, the ratio of the values of the resistors 62 and 104 controls the width of the hysteresis window provided to the switching. Thus, the thermostat 10 may be designed to have a hysteresis window the same or different from the hysteresis windows common with mechanical thermostats.

The resistors 34 and 102 along with the capacitor 100 form a low pass filter which determines the rise and fall rate of the voltage that appears at the gates G of the switching transistors Q1 and Q2. By appropriately selecting the values of the resistors 34, 102 and capacitor 100 to effect a desired RC time constant, the rate of change of current during turn-on and turn-off may be made to emulate the rise and fall rate of the AC power which is being controlled (i.e., selectively provided to the heater element 14). As a result of such "soft turn-on" and "soft turn-off", the thermostat 10 avoids introducing electromagnetic interference (EMI) at frequencies outside the operating frequency. In addition, the resistors 50 and 52 coupled to the gates of the switching transistors Q1 and Q2 help to further minimize any EMI noise.

The thermostat 10 preferably employs all surface mount technology so it fits on a circuit card that is approximately one inch, 1.2 inches long by 0.6 inch wide, for example, so it is very small. The input sensor 12 may be a commercially available TD5A, for example. The circuit board upon which the thermostat 10 is constructed may include an embedded copper plane in order to remove heat from the circuit.

Accordingly, it will be appreciated that the thermostat in accordance with the present invention replaces conventional mechanical and electronic thermostats that are used to control temperatures and regulate power. The thermostat may be used to control temperature and regulate power in heated hoses, floor panels, drain masts and water heaters in an aircraft, as well as in a variety of different temperature control systems not necessarily limited to aircraft applications. The thermostat is capable of operating using 115 volt AC single phase power from the power supply, and such AC power may be over a wide range of frequencies (e.g., from 0 Hertz (Hz) to 1000 Hz). This is particularly beneficial in aircraft applications where the supply voltage frequencies can vary significantly and include frequencies in which conventional thermostats are non-operational. The thermostat incorporates a soft start turn ON/OFF feature which reduces electromagnetic emissions (e.g., EMI). In addition, the thermostat provides common mode noise cancellation. The thermostat uses state of the art complementary metal-oxide-semiconductor (CMOS) and metal-oxide-semiconductor field effect transistor (MOSFET) technology which improves reliability over conventional mechanical relays and thermostats. Moreover, it will be appreciated that custom temperature set points and custom temperature hysteresis can be selected at the time of production and/or subsequent to production.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A low noise solid state thermostat, comprising:
   a thermostat input operatively configured to be coupled to a temperature sensor;
   a comparator for comparing an output of the temperature sensor to a predetermined set-point temperature; and
   solid-state switching circuitry operatively coupled to the comparator for selectively switching current to a thermostat output based on an output of the comparator,
   wherein the solid-state switching circuitry includes means for providing soft switching between an on-state in which current is provided to the thermostat output and an off-state in which current is not provided to the thermostat output, the thermostat operates based on an AC power supply, and the means for providing soft switching causes a rate of change of current provided to the thermostat output to be substantially the same as a rise and fall rate of the AC power supply.

2. The thermostat of claim 1, wherein the solid-state switching circuitry includes at least one switching transistor connected in series with the thermostat output, and the means for providing soft switching includes a low-pass filter coupled between an output of the comparator and a gate of the at least one switching transistor.

3. The thermostat of claim 2, wherein the low-pass filter comprises a resistor-capacitor circuit having a time constant substantially the same as the rise and fall rate of the AC power supply.

4. The thermostat of claim 1, wherein the solid-state switching circuitry includes a pair of switching transistors connected in series with the thermostat output.

5. The thermostat of claim 4, wherein the pair of switching transistors are MOSFETs.

6. The thermostat of claim 5, wherein the source of each of the pair of switching transistors is coupled to a circuit common.

7. A low noise solid state thermostat, comprising:
   a thermostat input operatively configured to be coupled to a temperature sensor;
   a comparator for comparing an output of temperature sensor to a predetermined set-point temperature; and
   solid-state switching circuitry operatively coupled to the comparator for selectively switching current to a thermostat output based on an output of the comparator, wherein the predetermined setpoint temperature is based on a voltage derived from a floating supply voltage provided within the thermostat.

8. The thermostat of claim 7, wherein the thermostat comprises a capacitor and zener diode connected in parallel between a floating supply voltage line and a circuit common.

9. The thermostat of claim 8, wherein during AC operation of the thermostat the capacitor charges via current provided by the zener diode during one of negative and positive half-cycles, and the capacitor holds the charge during the other of negative and positive half-cycles.

10. The thermostat of claim 8, wherein during DC operation of the thermostat the capacitor charges via current provided on the floating voltage supply line and the total charge on the capacitor is regulated by the zener diode.

11. A low noise solid state thermostat, comprising:

a thermostat input operatively configured to be coupled to a temperature sensor;

a comparator for comparing an output of the temperature sensor to a predetermined set-point temperature; and solid-state switching circuitry operatively coupled to the comparator for selectively switching current to a thermostat output of the comparator, wherein the thermostat comprises means to operate both on AC power and DC power applied to a same set of power terminals.

12. The thermostat of claim 11, further comprising circuitry for providing common mode filtering of noise introduced at the thermostat input.

13. A low noise solid state thermostat, comprising:

a thermostat input operatively configured to be coupled to a temperature sensor;

a comparator for comparing an output of the temperature sensor to a predetermined set-point temperature; and solid-state switching circuitry operatively coupled to the comparator for selectively switching current to a thermostat output based on an output of the comparator, wherein the comparator and solid-state switching circuitry include a hysteresis window with respect to switching current to the thermostat output.

14. The thermostat of claim 13, wherein the width of the hysteresis window is controlled by at least one feedback resistor coupled to the comparator.

* * * * *